Oct. 31, 1961     O. HALPERN     3,007,160
METHOD OF REDUCING REFLECTION OF INCIDENT ELECTROMAGNETIC WAVES
Original Filed Jan. 17, 1946
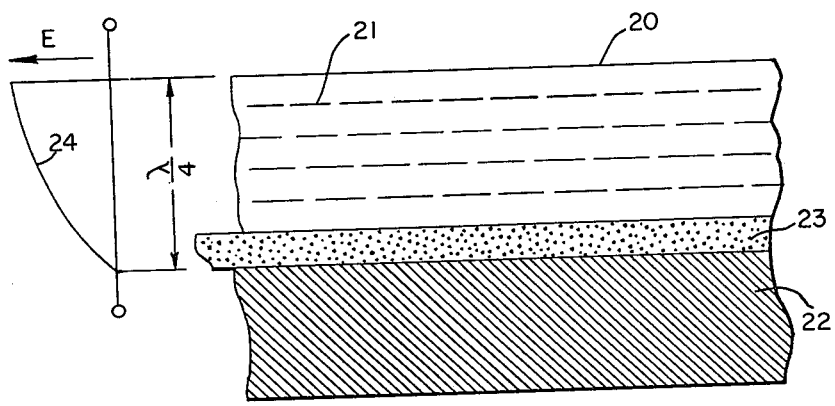
INVENTOR
OTTO HALPERN
BY
ATTORNEYS United States Patent Office 3,007,160
Patented Oct. 31, 1961

3,007,160
METHOD OF REDUCING REFLECTION OF INCIDENT ELECTROMAGNETIC WAVES
Otto Halpern, Pacific Palisades, Calif., assignor to the United States of America as represented by the Secretary of the Navy
Continuation of application Ser. No. 641,828, Jan. 17, 1946. This application Nov. 29, 1957, Ser. No. 699,872
2 Claims. (Cl. 343—18)

This application is a continuation of application Serial No. 641,828, filed January 17, 1946, now abandoned, for "Absorbent for Electro-magnetic Waves."

This invention relates to a method of producing a layer for minimizing the reflection of high frequency radio waves of a preselected wavelength incident upon surfaces and objects which would normally reflect such waves. The invention is more specifically related to a method for producing a resonant layer for minimizing the radio wave reflecting characteristics of objects against searching radio echo detection apparatus by control of the thickness of the adhesive used to bond the layer to the surface to be covered thereby.

An object of this invention is to provide a novel method for producing a coating for preventing reflection toward space of microwave radiation from a reflecting surface upon which such radiation is caused to impinge.

Another object of this invention is to provide a novel method for producing a coating of the class indicated by forming a film of material having a thickness less than an odd multiple of a quarter-wavelength of the incident radiation impinging thereupon, and bonding the film to a reflecting surface by means of a bonding material of sufficient thickness to provide a combination film and bonding material having a total thickness equal to an odd multiple of a quarter-wavelength of the incident radiation as measured inside the combined coating.

A further object of this invention is to provide a novel method for producing a coating of the class described by forming a film of material having a high dielectric constant and a thickness less than a quarter-wavelength of the incident radiation impinging thereupon, and bonding said film to a reflecting surface by means of a suitable binder of sufficient thickness to provide a combination film and binder having a total thickness equal to a quarter-wavelength of the incident radiation as measured inside the coating.

Other objects of this invention will become apparent from the following descriptions and claims taken in connection with the accompanying drawing, in which, the figure illustrates a reflecting surface provided with a coating and adhesive as contemplated by this invention.

Various methods are known to those skilled in the art for protecting good reflectors such as electrically conductive surfaces from incident radio waves of high frequencies. One such method which may be designated as the "resonant" method consists in affixing a sufficiently high-loss dielectric layer upon the metallic surface of the reflector which is to be protected. It has been found that the dielectric material must have a thickness which is an odd multiple of one-quarter of the wavelength of the incident radiation, measured inside the dielectric material, and a high-frequency loss of sufficient magnitude which may be due either to surface treatment of the dielectric material or internal losses in it. Various flake-pigmented layers made with different binders possessing the necessary characteristics above referred to are fully disclosed and described in my copending application bearing Serial No. 581,179, filed March 5, 1945, now U.S. Patent 2,923,934. Among these high-loss dielectric layers are, for example, aluminum flakes dispersed throughout polystyrene with a plasticizer, copper flakes dispersed throughout a polystyrene binder, and aluminum flakes in vistanex and estergum. These flakes are preferably of flat formation having a thickness between $3 \times 10^{-5}$ and $2 \times 10^{-4}$ centimeters, with the long dimensions as high as seventy times the average thickness.

Example No. 1.—Aluminum flake 76%, vistanex and estergum 24%, prepared by cross smoothing. Index of refraction 57.5. Reflected intensity at resonance 8%. No directional properties in plane of film.

Example No. 2.—Aluminum flake, polystyrene with plasticizer (70%, 15% and 15%) by cross smoothing. Index of refraction 45. Intensity reflected at resonance 1%. No directional properties in plane of film.

Example No. 3.—Copper flakes in polystyrene, 37½ and 62½% pressed. Index of refraction 6. Intensity reflected at resonance immeasurably small. No directional properties in plane of film.

Example No. 4.—Aluminum flake in polystyrene, 37½ and 62½% pressed. Index of refraction 8.8. Intensity reflected at resonance immeasurably small. No directional properties in plane of film.

Example No. 5.—Steel flake, plus clay, plus synthetic rubber binder known as "GR–I," 40%, 30%, 30%. Calendered and pressed, one layer crossed on top. Index of refraction 7.9 Intensity reflected at resonance 1%. No directional properties in plane of film.

Example No. 6.—Aluminum flake in vistanex and estergum, 80%, 15%, 5%. Hand smoothed. Principal indices of refraction 64.5 and 71.5. Intensities reflected at resonance 22% and 16%.

Example No. 7.—Aluminum powder in synthetic rubber binder known as "GR–S," 75% and 25%. Hand mixed, hand smoothed. Principal indices of refraction 46 and 52. Intensities reflected at minimum 31% and 3%.

Conductors like aluminum, copper, iron, steel, Permalloy and graphite flakes and mixtures thereof, have been utilized in accordance with the invention. The flakes average in thickness between $3 \times 10^{-5}$ and $2 \times 10^{-4}$ centimeters, with the long dimension as high as seventy times the average thickness. The commercial processes for producing so-called "bronze paint pigment" of various metals yield flakes which are satisfactory in size and shape for the purposes of this invention. The shapes vary from that of disks to that of thread-like particles.

In the production of resonant absorbing layers of the above referred to type, great difficulty has been encountered in the control of the resultant layer thickness when such a layer is applied directly to the surface of a reflector. This is due to the fact that the thickness of these layers is extremely critical and must usually be controlled to a very small fraction of a millimeter. Such control is exceedingly difficult where the layer is applied directly to the surface to be covered due to limitations and inadaptability of known measuring methods thereto.

By my present invention the above-named difficulties are obviated in obtaining an absorbing layer having a thickness which may readily be determined with a high degree of accuracy. A thin film of flake-pigmented binder of a thickness slightly less than a resonant odd quarter-wavelength is first spread and allowed to dry on a flat smooth surface. This film is then removed, as by being peeled off, and the thickness thereof is measured by conventional means such as a micrometer. A thin coating of accurately controlled thickness of adhesive material is then applied to the underside of the absorbing film or to the surface to be covered or both, the thickness of this adhesive being such as to make up the difference in thickness between that of the flake-pigmented film and a quarter-wavelength or an odd multiple thereof as measured inside the layer. The conducting surface to be coated and the flake-pigmented film are then joined and bonded by means of the adhesive to form the absorbing coating on the reflecting surface.

For practical purposes the proper layer thickness may be determined by first measuring the real and imaginary parts of the dielectric constant and likewise of the magnetic permeability. This may be done in accordance with known techniques. It has been found that for waves of a frequency of 3,000 megacycles the thickness of the resonant layer (quarter-wavelength) may be as thin as about one-half millimeter. If the bandwidth of the layer is to be increased, this dimension must be increased, as previously described.

As shown in the figure, the absorbing element consists of a film 20 being pigmented with flakes 21 of electrically conductive material secured to a reflecting surface 22 by means of a suitable adhesive 23. The total thickness of the film and adhesive being equal to a quarter-wavelength or an odd multiple of a quarter wavelength of the incident radiation, such wavelength being measured inside the combination dielectric and adhesive materials. As shown, the thickness of the bonding material is preferably small as compared to that of the dielectric film.

Reference is made to the sinusoidal voltage distribution curve 24 shown plotted at the left of the figure. Voltage is maximum at the outside surface of layer 20 and zero at the surface of the conducting surface 22. Since the voltage field is nearly zero at the conducting surface, and since the adhesive thickness is small relative to the total layer thickness, the actual dielectric constant of the adhesive is immaterial in affecting the operation of the layer. That is, it acts substantially as it would if it had the same dielectric constant as the flake-pigmented film, and it is therefore possible to calculate adhesive thickness accordingly. It is to be noted that layers as heretofore described may be either of the isotropic or anisotropic variety as may be found to be preferable for particular applications.

While there has been described herein certain preferred embodiments of my invention and methods for practicing said invention, it will be apparent that various changes may be made without departing from the invention, and it is therefore intended that the appended claims shall cover all such changes and modifications as fall within the spirit and scope of the invention.

What is claimed is:

1. The method of reducing the amount of incident wave energy of a selected frequency which is reradiated toward space from a reflecting surface, which comprises bonding thereto with a thin dielectric adhesive layer, a preformed film of dielectric material having electrically conducting flakes dispersed therethrough, the total thickness of said film and said thin dielectric adhesive layer being equal to one quarter-wavelength of said wave energy in said film and layer.

2. The method of reducing the amount of incident wave energy of a selected frequency which is radiated toward space from a reflecting surface which comprises, producing a thin film of conductive flake pigmented binder of a thickness slightly less than a resonant odd quarter wavelength, bonding the film to the surface with a thin dielectric adhesive layer, the thickness of adhesive being such as to make up the difference in thickness between that of the film and an odd multiple of an energy quarter wavelength in the composite of film plus layer.

References Cited in the file of this patent

UNITED STATES PATENTS

| | | |
|---|---|---|
| 2,019,951 | Caprio | Nov. 5, 1935 |
| 2,293,839 | Linder | Aug. 25, 1942 |
| 2,426,820 | Evans et al. | Sept. 2, 1947 |
| 2,436,578 | Korn et al. | Feb. 24, 1948 |
| 2,491,477 | Chimel | Dec. 20, 1949 |
| 2,508,479 | Wheeler | May 23, 1950 |
| 2,594,971 | Moulin | Mar. 29, 1952 |
| 2,599,944 | Salisbury | June 10, 1952 |
| 2,656,535 | Neher | Oct. 20, 1953 |

OTHER REFERENCES

Dallenbach et al: Hochfregvenztechnik and Elektrokustik, Band 51, Helft 5, Mai 1938, pp. 152–156.